US006622830B2

United States Patent
Oliver et al.

(10) Patent No.: US 6,622,830 B2
(45) Date of Patent: Sep. 23, 2003

(54) ROTARY DAMPER

(76) Inventors: Michael L. Oliver, 1315 Smith Rd., Xenia, OH (US) 45385; William C. Kruckemeyer, 2935 Tara Trail, Beavercreek, OH (US) 45434; Mark Bodie, 232 Park Dr., Dayton, OH (US) 45410; Ronald G. Smith, Jr., 655 Bischoff Rd., New Carlisle, OH (US) 45344; James E. Dingle, 8779 Hollyhock, Cincinnati, OH (US) 45231

( * ) Notice: Subject to any disclaimer, the term of this patent is extended or adjusted under 35 U.S.C. 154(b) by 0 days.

(21) Appl. No.: 09/800,028

(22) Filed: Mar. 6, 2001

(65) Prior Publication Data

US 2002/0125085 A1 Sep. 12, 2002

(51) Int. Cl.[7] ................................. F16F 9/14
(52) U.S. Cl. ...................... 188/306; 188/310
(58) Field of Search ................ 188/306, 308, 188/309, 310, 290–296, 307; 280/124.13, 124.116, 124.137, 124.152; 16/57, 54, 82, 51; 464/24; 74/573 R (56) References Cited

U.S. PATENT DOCUMENTS

| 933,076 A | 9/1909 | Houdaille |
|---|---|---|
| 2,334,340 A | 11/1943 | Magrum |
| 2,358,988 A | 9/1944 | Magrum |
| 2,409,505 A | 10/1946 | Magrum |
| 4,411,341 A | 10/1983 | Schultz |
| 4,503,952 A | 3/1985 | Hesse |
| 4,768,630 A | 9/1988 | Aubry et al. |
| 4,886,149 A | 12/1989 | Uehara et al. |
| 4,893,700 A | 1/1990 | Gramss |
| 4,913,255 A | 4/1990 | Takayanagi et al. |
| 4,926,984 A | 5/1990 | Pollitt |
| 5,005,859 A | 4/1991 | Satoh et al. |
| 5,074,581 A | 12/1991 | Matsuoka |
| 5,152,189 A | 10/1992 | Miura et al. |
| 5,450,932 A | 9/1995 | Nash |
| 5,810,129 A | 9/1998 | Hanawa et al. |
| 5,901,821 A | 5/1999 | Hanawa |
| 5,988,329 A | 11/1999 | Evans, Jr. et al. |
| 6,082,507 A | 7/2000 | Förster |
| 6,085,384 A | 7/2000 | Bivens |
| 6,089,121 A | 7/2000 | Lohaus |
| 6,098,765 A | 8/2000 | Kato et al. |
| 6,119,839 A | 9/2000 | Jäckel et al. |
| 6,119,840 A | 9/2000 | Dettmar |
| 6,120,046 A | 9/2000 | Daly |
| 6,121,526 A | 9/2000 | Kobori et al. |
| 6,341,677 B1 * | 1/2002 | Oliver et al. ........... 188/307 |
| 6,536,565 B2 * | 3/2003 | Oliver et al. ........... 188/307 |

FOREIGN PATENT DOCUMENTS

EP 0 240 499 B1 10/1989

* cited by examiner

*Primary Examiner*—Douglas C. Butler
(74) *Attorney, Agent, or Firm*—Scott A. McBain (57) ABSTRACT

A rotary damper for use in motor vehicle suspensions comprising a rotor disposed within damping fluid in a fluid chamber of a casing to form inner fluid volume and outer fluid volume, with first valve and second valve for controlling flow between the inner fluid volume and the outer fluid volume, and an accumulator using closed cell foam as a compressible material for fluid fill variation and thermal expansion. First valve controls flow from the outer fluid volume to the inner fluid volume for one direction of rotation of the rotor, while second valve controls flow from the inner fluid volume to the outer fluid volume for the opposite rotation of the rotor. Thus, the valves are configured to provide independent control of damping for each direction of rotation. A valve holder supporting the valves and providing flow passages is designed for powdered metallurgy fabrication.

20 Claims, 6 Drawing Sheets

ROTARY DAMPER

TECHNICAL FIELD

This invention relates generally to the field of rotary dampers, and in particular, to rotary dampers for use in motor vehicle suspensions.

BACKGROUND OF THE INVENTION

Rotary dampers, as used in vehicle suspensions, typically include a body with a means of fixed attachment and an axle or shaft that is used for rotary attachment. Bodies of vane type dampers have chambers containing fluid and the axle is attached to a rotor with a vane or vanes closely fit into the fluid chambers. When torque is applied to the axle to cause rotation, the vanes apply pressure on the fluid to cause the fluid to flow through orifices or valves. The resistance of the fluid to flow through the orifices or valves causes the rotary damper to resist or damp the motion that is a result of the torque applied to the shaft. This type rotary damper generally includes some air space or a gas accumulator to allow for fluid thermal expansion and fill variation.

Currently, rotary dampers are manufactured with portions of the assembly, such as the valves, orifices, or accumulator, external to the body. This increases the complexity of manufacture and installation. Extra steps are required to install the rotary dampers in the motor vehicle. Parts are exposed, leaving them vulnerable to damage.

In addition, many machining steps are required to meet the high dimensional tolerances required and to form the flow passages directing the fluid through the rotary damper during operation. This increases the cost of manufacture.

Rotary dampers typically provide the same damping regardless of the direction of axle rotation, limiting tuning options. The same torque is applied to the axle whether that is the proper amount of torque needed for that direction.

Accumulators are typically complex mechanical devices, using pistons and seals to provide a gas plenum. This requires fine machining to form a smooth surface piston travel. In addition, the accumulator must be charged with gas before installation, adding another manufacturing step. Seals may fail during operation, allowing the gas to escape the plenum so that the accumulator fails.

Accordingly, it would be desirable to have a rotary damper that overcomes the disadvantages described.

SUMMARY OF THE INVENTION

One aspect of the invention provides all valves, orifices and an accumulator to be housed in the body, allowing easy assembly, a compact overall package, and a simple, rugged case.

Another aspect of the invention provides valves configured to provide independent control of damping for each direction of rotation.

Another aspect of the invention provides a design taking advantage of powder metallurgy fabrication, producing precision parts while reducing the machining required and the cost of manufacturing.

Another aspect of the invention provides a closed cell foam accumulator to reduce fabrication and assembly costs and to increase reliability.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DESCRIPTION OF THE PREFERRED EMBODIMENT

Figure 1:
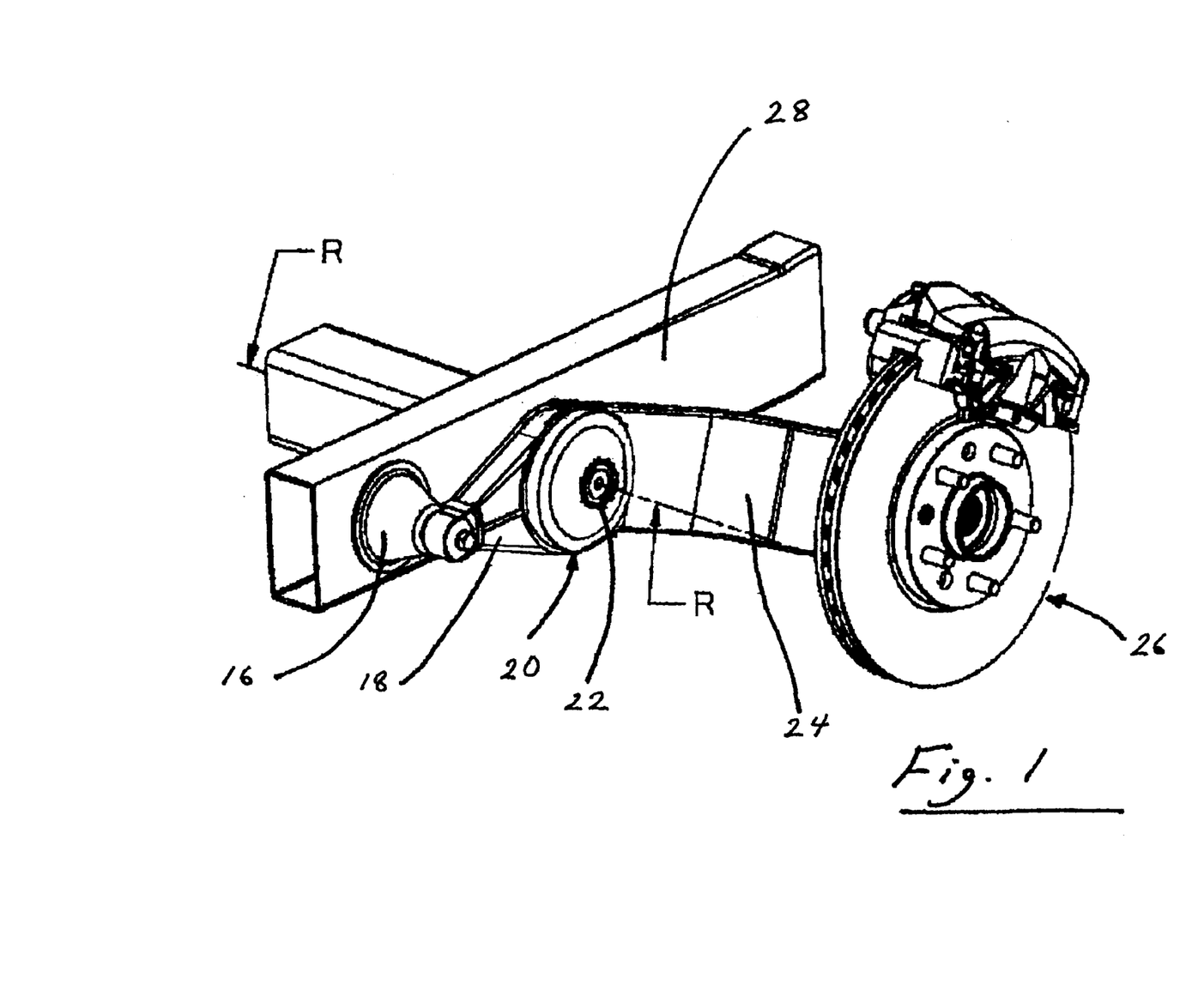
FIG. 1 is a perspective view of a suspension system incorporating a rotary damper that is made in accordance with the present invention.

FIG. 1 is a perspective view of a suspension system incorporating a rotary damper that is made in accordance with the present invention. Trailing arm 24 supports wheel assembly 26 and is pivotably attached to chassis member 28. Rotary damper 20 has an axle 22 engaging the trailing arm 24 at the pivot point and providing torque to resist the motion of the trailing arm 24. Mounting post 16 projects from the chassis member 28 and connects to mounting arm 18 of the rotary damper 20 to hold the rotary damper 20 stationary.

Figure 2:
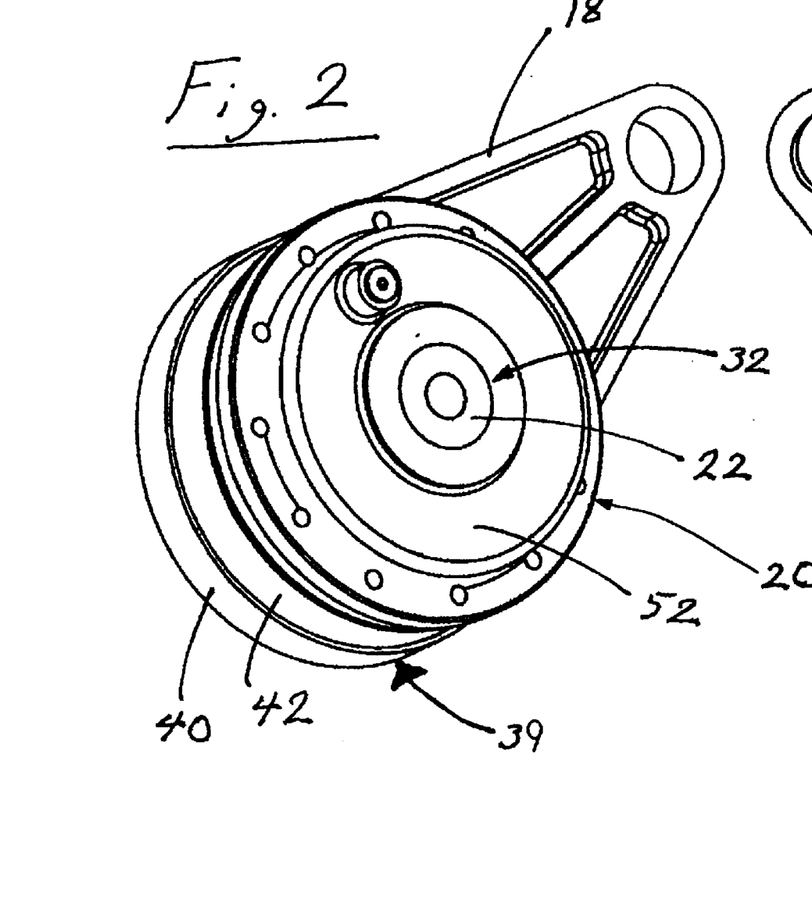
FIGS. 2 & 3 are external views of a preferred embodiment of a rotary damper that is made in accordance with the invention.
Figure 3:
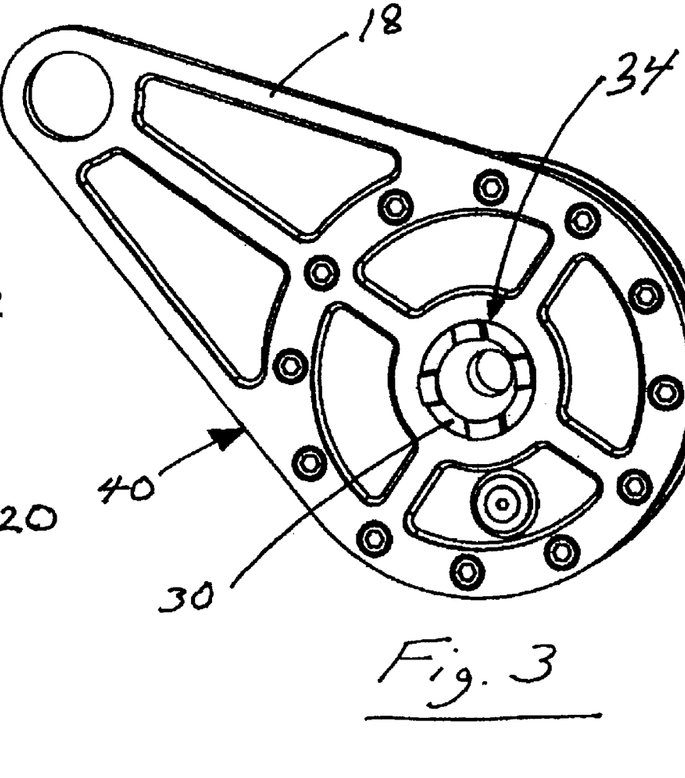

As shown in the external views of FIGS. 2 and 3, rotary damper 20 has a base 40, a stator 42, and a cover 52. Mounting arm 18 is a part of base 40. Axle 22 passes through cover opening 32 of the cover 52 and axle lugs 30 pass through base opening 34 of the base 40. Seals around the openings prevent leakage of damping fluid from the rotary damper. Casing 39 forms a fluid chamber for the damping fluid and comprises the base 40, the stator 42, and a valve holder within the cover 52.

Figure 4:
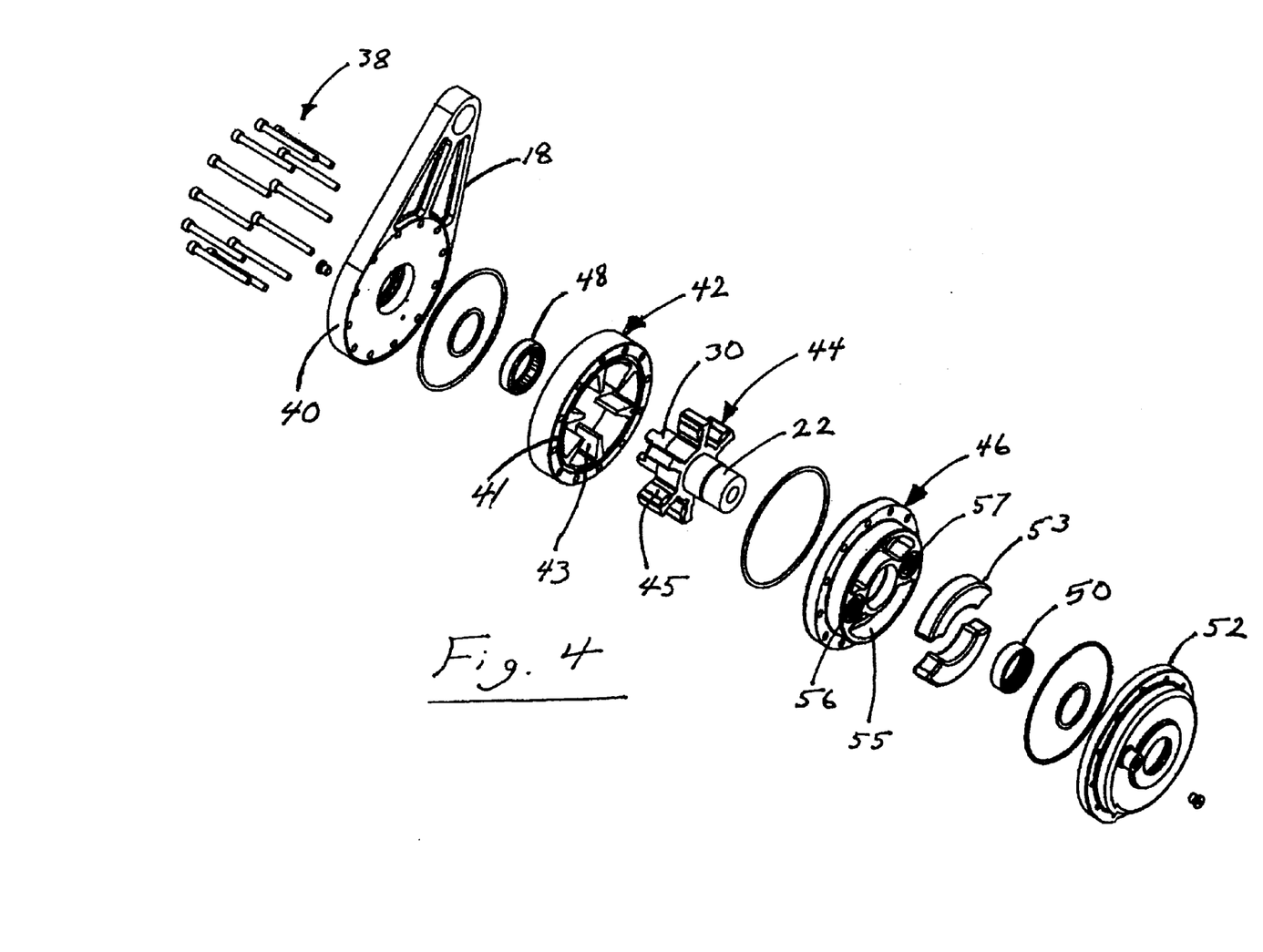
FIG. 4 is an exploded view of a preferred embodiment of a rotary damper that is made in accordance with the invention.

FIG. 4 shows an exploded view of the rotary damper parts in the final assembly. The base 40 forms one side of the casing 39 for the fluid chamber and provides a mounting arm 18 as an attachment point to prevent rotation of the base 40 while damping. The stator 42 forms the outside circumference of the casing 39 and has stator vanes 43 and includes grooves 41 for seals. The preferred embodiment illustrated has six stator vanes, but number of vanes may vary as desired. The rotor 44 has the same number of rotor vanes 45 as stator 42 has stator vanes 43. Axle lugs 30 and axle 22 form a shaft that supports the rotor vanes 45 and projects out of the front and back of the final assembly to transfer the damping torque to the load.

The valve holder 46 forms spaces for and supports first valve 56 and second valve 57. The valve holder 46 also forms the remaining side of the casing 39 and forms accumulator voids 55 for installation of accumulator foam 53. Internal paths formed in the valve holder 46 by powder metallurgy route fluid flow from the fluid chamber to the valves in such a way that its own valve controls each direction of rotation. (See FIGS. 6 & 7) First bearing 48 and second bearing 50 housed in the base 40 and the valve holder 46, respectively, hold the rotor in alignment. The cover 52 forms one boundary of the accumulator, retains fluid in the assembly, and prevents contamination. Fasteners 38, such as bolts or screws, hold the assembly together. O-rings or other seals are used to seal the assembly at all exterior seams. Fill and drain plugs are provided to add or remove damping fluid from the rotary damper.

The accumulator voids 55 in valve holder 46, accumulator foam 53 installed within the accumulator voids 55, and the fluid side boundary of the cover 52 forms the accumulator. Accumulator foam 53 is a piece of gas containing closed cell elastomeric foam that collapse to provide for fluid thermal expansion and fluid fill variation. In a preferred embodiment, the accumulator foam 53 is made of neoprene rubber closed cell foam, but any closed cell foam compatible with the damping fluid, cycling, and environment would be suitable. The accumulator is connected to the fluid chamber through leakage flow from one of the valves and internal leakage across various seals. (See FIG. 6) An alternate embodiment could use a small hole connecting the fluid chamber and the accumulator.

Powdered metallurgy can be used advantageously to fabricate the major parts of the rotary damper to a high degree of precision. Machining is reduced, increasing manufacturing efficiency. Rotary damper parts must be made to tight tolerances to limit leakage between moving parts. To make a part using powdered metallurgy, powdered metal is packed into a form and sintered at temperature. The metal changes from powder to a single part. Smaller components may be formed in pieces, and then re-sintered to make a larger part. For the rotary damper, base 40, stator 42, rotor 44, valve holder 46, and cover 52 can be formed with powdered metallurgy, although the base 40 presents a challenge due to its size and the cover 52 and may not require the strength of a powdered metallurgy part because it operates at low pressure. The fabrication of the valve holder 46 is covered further in the discussion of FIGS. 7 & 8 below.

Figure 5:
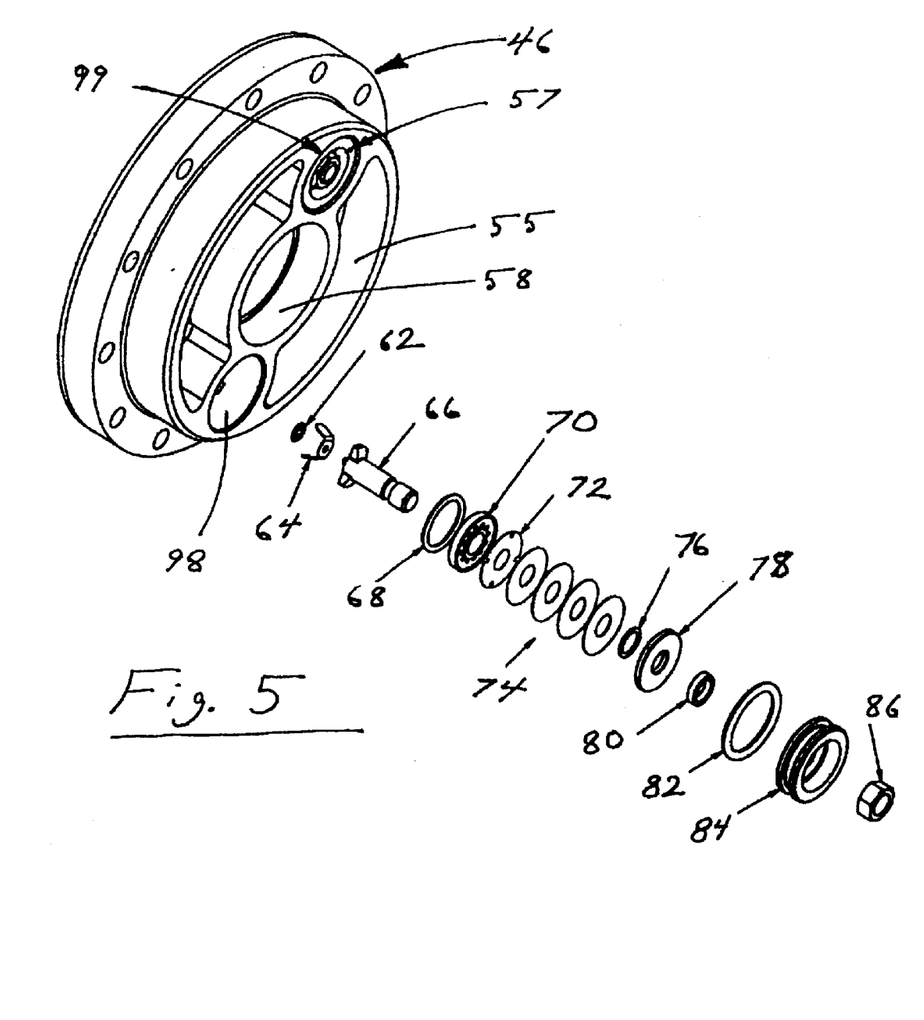
FIG. 5 is an exploded view of a valve and valve holder of a preferred embodiment of a rotary damper that is made in accordance with the invention.

FIG. 5 is an exploded view of a valve and valve holder of a rotary damper built according to a preferred embodiment. The valve holder 46 has first valve cavity 98, a second valve cavity 99, a valve holder opening 58, and accumulator voids 55. Second valve 57 is shown installed in second valve cavity 99 and the first valve is shown in an exploded format extending from the first valve cavity 98. Although two valves are used in the preferred embodiment, more valves could be used if more flow paths are desired.

Referring to the typical valve components shown on FIG. 5, valves are used to tune rotary dampers to perform as required in each application and valve components may vary in quantity, size and sequence of assembly. Valve bolt 66 holds the valve parts in place in the valve holder 46. During assembly, the spring 64 and retainer 62 are installed on the end of the valve bolt 66, which is then pressed through an elongated hole in the valve holder 46, turned about 90 degrees, and released. The valve bolt 66 is held in position by the spring 64 and prevented from turning by a keeper slot in the valve holder 46. The first o-ring 68 and valve seat 70 forms a seat for other valve parts. The first o-ring 68 forms a seal between the valve seat 70 and the valve holder 46. The orifice plate 72 is optionally installed if an orifice is needed when the unit is tuned. The deflected discs 74 regulate flow through the valve depending on the pressure applied to it. The number, thickness and diameter of discs will vary as the unit is tuned for use in a particular application. The thickness of the first spacer 76 regulates how much the deflected discs 74 may open and the stop plate 78 provides the stop for the deflected discs 74. The second spacer 80 is optionally used to provide consistent axial location of the valve cover 84 within the first valve cavity 98. This valve cover 84 encloses the valve cavity to direct the fluid flow through the paths and into the main fluid chamber. The second o-ring 82 is installed on the valve cover 84 as a seal and may optionally be omitted on one valve cover to allow limited fluid flow to and from the accumulators. The nut 86 secures and pressure loads the valve parts.

Figure 6:
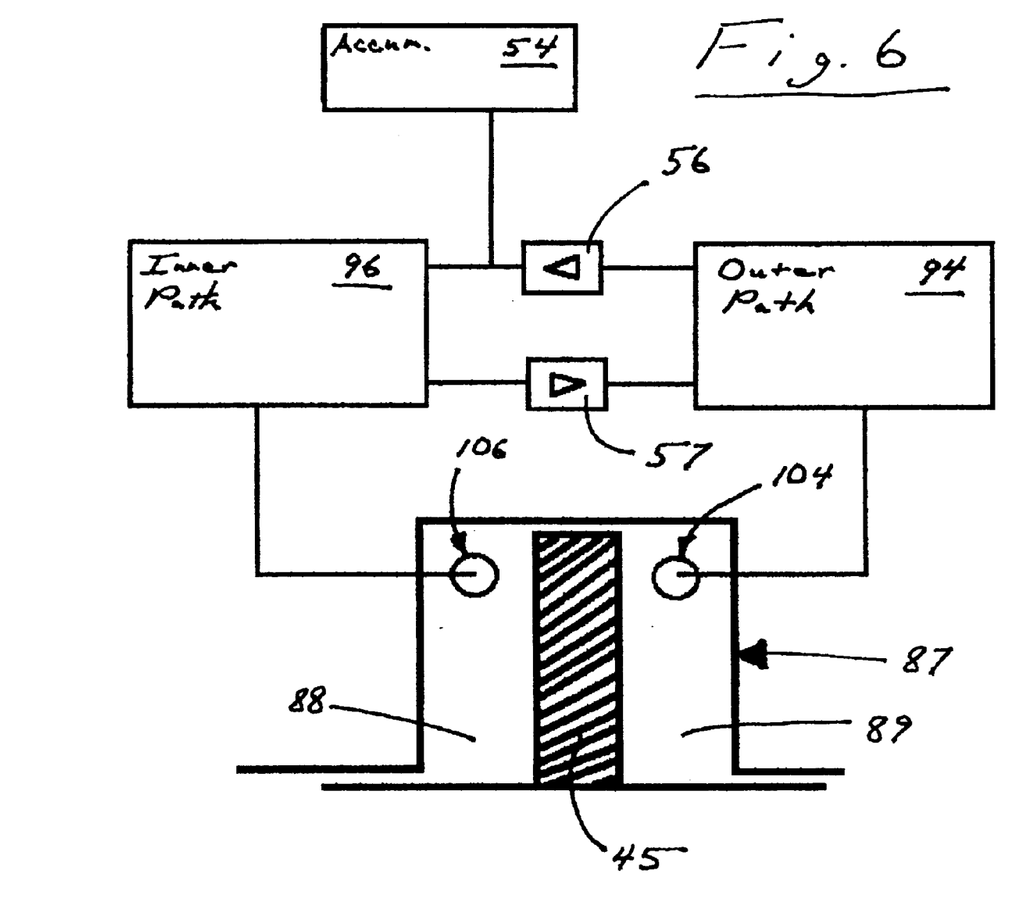
FIG. 6 is a schematic diagram of a preferred embodiment of a rotary damper that is made in accordance with the invention.

FIG. 6 is a schematic diagram of the damping fluid flow paths through the rotary damper. Fluid chamber 87 is divided into inner fluid volume 88 and outer fluid volume 89 by the rotor vane 45. Inner path hole 106 connects inner fluid volume 88 to inner path 96 and outer path hole 104 connects outer fluid volume 89 to outer path 94. Because there are a number of the rotor vanes, there are a number of fluid volumes, each with holes to the inner and outer paths. Inner path 96 is connected to outer path 94 through first valve 56 and second valve 57. Accumulator 54 is connected to the downstream side of one of the valves.

For clockwise rotor motion, the rotor vane 45 moves to the right forcing the damping fluid in the outer fluid volume 89 through the outer path hole 104 and into the outer path 94. Flow continues from the outer path 94, through the center passage of the first valve 56, through the first valve 56, through the upper hole of the first valve 56, to the inner path 96. The second valve 57 checks flow from the outer path 94 to the inner path 96 through the second valve 57, although some backflow through the second valve 57 may be allowed as an option for desired rotary damper tuning. Flow from the inner path 96 proceeds to the inner fluid volume 88 through the inner path hole 106. For counterclockwise rotor motion, the flow is from the inner fluid volume 88 through the inner path hole 106 to the inner path 96, through the second valve 57 to the outer path 94, from the outer path 94 through the outer path hole 104 to the outer fluid volume 89, with the first valve 56 blocking reverse flow from the inner path 96 to the outer path 94 through the first valve 56.

The first valve 56 controls the damping fluid flow for clockwise rotor motion and the second valve 57 controls the flow for counterclockwise rotor motion. The two valves are configured so that valve controlling each direction of rotation is distinct and can be adjusted independently. Because one valve governs flow for one direction of rotation and another control valve governs the opposite rotation, the rotary damper can be tuned to provide different damping for different directions by sizing the valves differently. This is ideal for motor vehicle applications because it is desirable to have a rotary damper that provides less resistance as the tire moves in the upward direction and more resistance as the tire moves downward.

The preferred embodiment uses valves similar to those used in linear shock absorbers, but alternate embodiments may use different flow control devices. The valves may be replaced with a separate flow control and check valve mounted in series to replace each valve. The check function may be omitted or replaced with pressure relief valves. The check function may contain leakage paths to allow backflow in the normally blocked direction. Orifices may be used to accomplish the control function. Different valve combinations, mixing orifices, pressure relief valves, and control valves, for example, will result in different tunings to achieve any desired damping response.

The accumulator 54 provides a volume for fill variation and thermal expansion. Typically, the fluid will expand once the motor vehicle trip starts and stay the same volume until the trip ends and the fluid cools. In a preferred embodiment, the accumulator 54 is connected to one of the valve cavities by omission of the second o-ring sealing the valve cavity from the accumulator void. (See FIG. 5) Damping fluid pressure forces the accumulator foam to compress and expand to take up the difference in fluid volume. The preferred embodiment uses the foam accumulator design, but alternate mechanical embodiments using gas volumes and pistons are also possible and are well known to persons skilled in the art.

Figure 7:
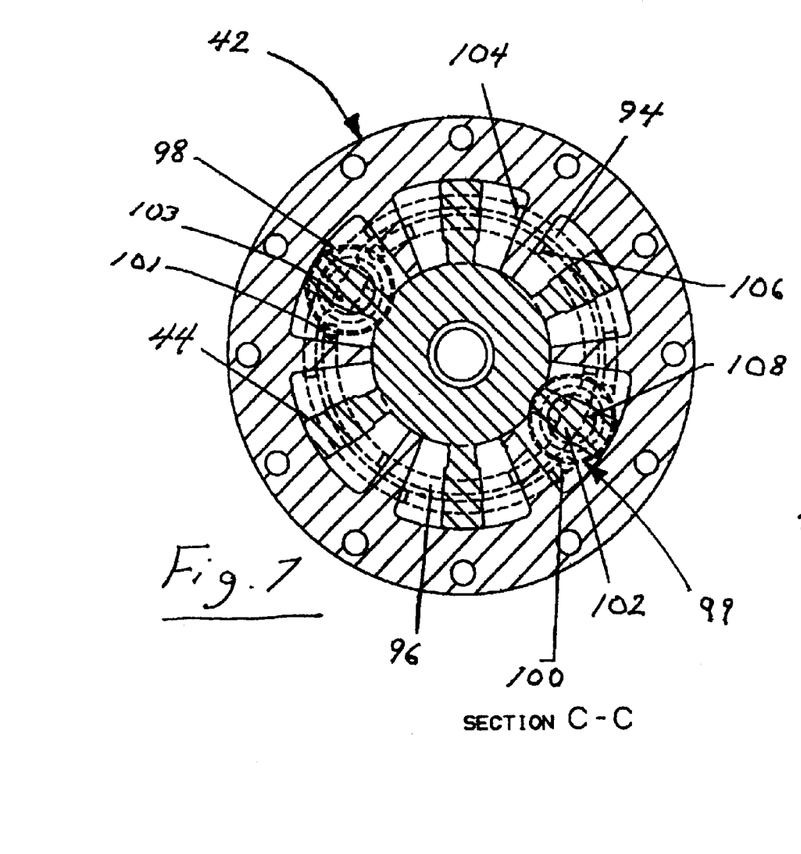
FIGS. 7 & 8 are an end view and a section view illustrating the paths of a preferred embodiment of a rotary damper that is made in accordance with the invention.
Figure 8:
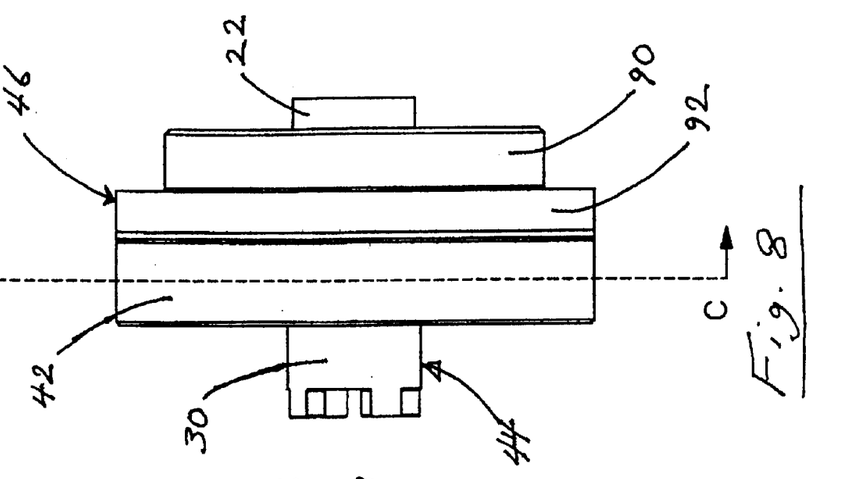

FIGS. 7 & 8 illustrates the paths in the valve holder 46, achieved through powder metallurgy. FIG. 7 shows section C—C from FIG. 8, which shows an end view of the rotary damper.

Referring to FIG. 7, the outer path 94 and the inner path 96 are shown in the section view. Each path opens to the main fluid chamber through its path holes, with one path hole for each rotor vane, and connects to one of the valve cavities at a center passage near the retained end of the valve bolt and the other valve cavity further inside with upper holes, away from the retained end of the valve bolt. First valve cavity 98 connects to the outer path 94 through first center passage 103 and connects to the inner path 96 through first upper hole 101. Second valve cavity 99 connects to the inner path 96 through second center passage 102 and connects to the outer path 94 through second upper hole 100. Outer path holes 104 lead from the outer path 94 to the main fluid chamber and inner path holes 106 from the inner path 96 to the main fluid chamber. Outer path holes 104 and inner path holes 106 are spaced so that, as the rotor rotates, pressurized fluid is applied to one of the two paths depending on the direction of rotation. This permits independent control of damping for each direction. Keeper slot 108 prevents the valve bolt from turning, once it is seated.

FIG. 8 shows an end view of the rotary damper with the rotor 44, the stator 42, and valve holder 46. Axle lugs 30 and axle 22 of the rotor 44 project from each side. Outer valve holder 90 and inner valve holder 92 were bonded during sintering to form valve holder 46. The valve holder 46 is particularly designed to take advantage of the benefits of powder metallurgy. The outer valve holder 90 and the inner valve holder 92 are each packed in separate molds. The inner path 96 and outer path 94 are molded into the face of the inner valve holder 92. This provides the accuracy required in locating the paths. The face of the inner valve holder 92 with the paths is placed against the face of the outer valve holder 90 not having the accumulator voids, and the two pieces are sintered to form one valve holder 46 with all paths, holes, and cavities accurately aligned. An alternative process would be to sinter the outer valve holder 90 and the inner valve holder 92 separately then re-sinter them to form the valve holder 46. The only machining that may be required to finish the piece is on the sealing surface where the valve holder 46 meets the stator 42, and these are intentionally designed as large flat surfaces to make them easy to machine and finish. Similarly, the other parts suitable for powdered metallurgy fabrication, such as the base 40, stator 42, rotor 44, and cover 52, are designed with large flat surfaces for easy finishing. (See FIG. 4).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A rotary damper using damping fluid comprising:
   a casing having a fluid chamber containing the damping fluid;
   a rotor having a rotor vane, the rotor rotatably disposed within the fluid chamber so the rotor vane divides the fluid chamber into an inner fluid volume and an outer fluid volume;
   an inner path connected to the inner fluid volume;
   an outer path connected to the outer fluid volume;
   a first means for controlling flow connecting the inner path and the outer path; and
   a second means for controlling flow connecting the inner path and the outer path.

2. The rotary damper of claim 1 wherein the first flow control means allows flow from the outer path to the inner path, but limits flow from the inner path to the outer path; and
   the second flow control means allows flow from the inner path to the outer path, but limits flow from the outer path to the inner path.

3. The rotary damper of claim 2 wherein the first flow control means allows a greater flow from the outer path to the inner path for a given clockwise rotation of the rotor than the second flow control means allows from the inner path to the outer path for an equivalent counterclockwise rotation of the rotor.

4. The rotary damper of claim 1 wherein the first flow control means allows flow from the outer path to the inner path, but checks flow from the inner path to the outer path; and
   the second flow control means allows flow from the inner path to the outer path, but checks flow from the outer path to the inner path.

5. The rotary damper of claim 3 wherein the first flow control means allows a greater flow from the outer path to the inner path for a given clockwise rotation of the rotor than the second flow control means allows from the inner path to the outer path for an equivalent counterclockwise rotation of the rotor.

6. The rotary damper of claim 1 wherein the first flow control means and the second flow control means are deflected disc valves.

7. The rotary damper of claim 1 further comprising an accumulator connected downstream of the first flow control means.

8. The rotary damper of claim 7 wherein the accumulator comprises an accumulator void and accumulator foam within the accumulator void.

9. The rotary damper of claim 8 wherein the accumulator foam is gas containing closed cell elastomeric foam.

10. The rotary damper of claim 9 wherein the accumulator foam is neoprene rubber closed cell foam.

11. A rotary damper using damping fluid comprising:
    a first bearing;
    a second bearing;
    a base having a base opening with the first bearing installed in the base opening;
    a valve holder having a valve holder opening with the second bearing installed in the valve holder opening, an inner path, an outer path, a first valve cavity connecting the inner path and the outer path, a second valve cavity connecting the inner path and the outer path and a inner path hole connected to the inner path, and an outer path hole connected to the outer path;

a stator having a plurality of stator vanes directed radially inward, the stator sandwiched between the base and the valve holder to form a fluid chamber containing the damping fluid, the base opening of base being axially aligned with the valve holder opening of the valve holder, and the inner path hole and the outer path hole opening to the fluid chamber between an adjacent pair of the stator vanes with the inner path hole near one of the adjacent pair of the stator vanes and the outer path hole near the other of the adjacent pair of the stator vanes;

a rotor having an axle passing through and supported by the second bearing, axle lugs passing through and supported by the first bearing, and at least one rotor vane directed radially outward from the axle, the rotor being rotatably disposed within the fluid chamber so that the rotor vane forms an inner fluid volume connected to the inner path hole and an outer fluid volume connected to the outer path hole;

a first valve installed in the first valve cavity; and a second valve installed in the second valve cavity;

wherein clockwise rotation of the rotor moves the rotor vane to force damping fluid from the outer fluid volume through the outer path hole into the outer path through the first valve to the inner path, and through the inner path hole to the inner fluid volume, and counterclockwise rotation of the rotor moves the rotor vane to force damping fluid from the inner fluid volume through the inner path hole into the inner path through the second valve to the outer path, and through the outer path hole to the outer fluid volume.

12. The rotary damper of claim 11 wherein the first valve and the second valve are deflected disc valves.

13. The rotary damper of claim 11 wherein the second valve allows backflow from the outer path to the inner path for clockwise rotation of rotor.

14. The rotary damper of claim 11 wherein the first valve allows backflow from the inner path to the outer path for counterclockwise rotation of rotor.

15. The rotary damper of claim 11 wherein the first valve and the second valve are tuned to provide different damping fluid flows when the rotor rotates in the clockwise direction from when the rotor rotates in the counterclockwise direction.

16. The rotary damper of claim 11 wherein the first valve and the second valve are tuned to provide different damping torque at the axle lugs when the rotor rotates in the clockwise direction from when the rotor rotates in the counterclockwise direction.

17. The rotary damper of claim 11 wherein the first valve provides leakage flow from the first valve cavity to an accumulator.

18. The rotary damper of claim 17 wherein the valve holder forms accumulator void sealed by a cover, and the accumulator comprises accumulator foam disposed within the accumulator void receiving the leakage flow from the first valve cavity.

19. The rotary damper of claim 18 wherein the accumulator foam is gas containing closed cell elastomeric foam.

20. The rotary damper of claim 19 wherein the accumulator foam is neoprene rubber closed cell foam.

* * * * *